July 11, 1961 B. LUSTMAN ET AL 2,992,178
HIGH STRENGTH CONTROL RODS FOR NEUTRONIC REACTORS
Filed March 31, 1958 4 Sheets-Sheet 1

WITNESSES
John C. Heasley Jr.
Charles L. Board

INVENTORS
Benjamin Lustman
Ezekiel F. Losco
Isadore Cohen
BY
William G. Addison
ATTORNEY United States Patent Office 2,992,178
Patented July 11, 1961

2,992,178
HIGH STRENGTH CONTROL RODS FOR NEUTRONIC REACTORS
Benjamin Lustman, Ezekiel F. Losco, and Isadore Cohen, Pittsburgh, Pa., assignors, by mesne assignments, to the United States of America as represented by the United States Atomic Energy Commission
Filed Mar. 31, 1958, Ser. No. 725,305
5 Claims. (Cl. 204—193.2)

This invention relates to high strength control rods for neutronic reactors and to neutronic reactors embodying the high strength control rods.

In neutronic reactors a neutron fissionable isotope, such, for example, as $U^{233}$, $U^{235}$, or $94^{239}$, or mixtures thereof, is subjected to fission by absorption of neutrons, and a self-sustaining reaction is established by the neutrons evolved by the fission. Neutronic reactors generally comprise bodies of compositions containing such fissionable material, for example, natural uranium closely associated with a neutron slowing or moderating material which slows the neutrons to thermal energies. Such a slowing material is referred to in the art as a moderator. Pressurized water, carbon, beryllium, and deuterium oxide are examples of suitable moderator materials for such use.

An effective method for regulating or controlling neutronic reactors is to move control rods of high neutron absorbing capacity material into and out of the neutronic reacting system. Also, a common method for terminating the reaction under emergency conditions is to move one or more neutron absorbing safety or "scram" control rods into the reactor. A control rod is moved slowly into and out of the neutronic reacting system to correct for small changes in the reactivity of the neutronic reactor. During "scramming" a control rod must be moved into proper position with great speed.

In selecting metals and alloys suitable for use in the fabrication of control rods for neutronic reactors, several metallurgy, mechanics and physics design requirements must be carefully considered. The major requirements may be indicated generally as follows:

(1) High total neutron absorption cross section and minimum loss of physics worth when subjected to irradiation for long periods of time.

(2) Metallurgical stability under neutron irradiation and freedom from harmful irradiation damage that will prevent proper functioning during reactor operation.

(3) Good resistance to corrosion when used in high temperature pressurized water.

(4) Substantial freedom from thermal distortion under non-uniform temperature conditions during reactor operation.

(5) Sufficient mechanical strength and ductility to withstand scramming loads during operation.

(6) Sufficient creep strength to prevent distortion due to center line differential coolant pressure when rods are not accurately aligned within the rod channel.

In application Serial No. 688,995, filed October 8, 1957 and assigned to the assignee of the present invention, there are disclosed certain alloy compositions suitable for use in fabricating control rods for use in neutronic reactors.

Control rods fabricated from the alloys compositions set forth in application Serial No. 688,995 and in the manner therein set forth have yield strengths (at 0.2% offset) of from about 11,000 p.s.i. to about 12,600 p.s.i. Control rods possessing yield strengths in these ranges are satisfactory for the industrial type power reactors such, for example, as the pressurized water type.

Power reactors for military and naval use, on the other hand, impose additional and more severe strength requirements on control rods employed therein. Thus, for example, control rods employed in neutronic reactors that are used to power submarines must be capable of withstanding high impact loads of the type that may be developed by the nearby explosion of depth bombs.

For safe operation of control rods under conditions as above described, the control rods should have a yield strength higher than 10,000 p.s.i. and preferably above 15,000 p.s.i. at temperatures of from about 550° F. to 600° F. It is apparent that the yield strength of the control rods disclosed in application Serial No. 688,995 are marginal for application in military type reactors.

It is therefore desirable to have available in the art control rods that have yield strengths in excess of about 15,000 p.s.i. at temperatures of from about 550° F. to 600° F. and at the same time possess the several metallurgy, mechanics and physics design requirements enumerated above.

The object of this invention is to provide a control rod suitable for use in neutronic reactors designed for military use, said control rod having good mechanical strength at elevated temperatures and preferably above 15,000 p.s.i. at 550° F.

Another object of this invention is to provide a high strength control rod for use in neutronic reactors, said control rod being fabricated from certain metal alloy powder having a thin metal oxide layer on the surface of the individual particles.

A further object of this invention is to provide in a neutronic reactor having means for producing neutrons therein, a means for controlling the number of neutrons produced, said means being fabricated from metal alloy powder having a thin metal oxide layer on the surface of the individual particles.

Other objects of the invention will, in part, be obvious and will, in part, appear hereinafter. For a fuller understanding of the nature and the objects of the invention, reference should be had to the following detailed description and drawing, in which.

Figure 1:
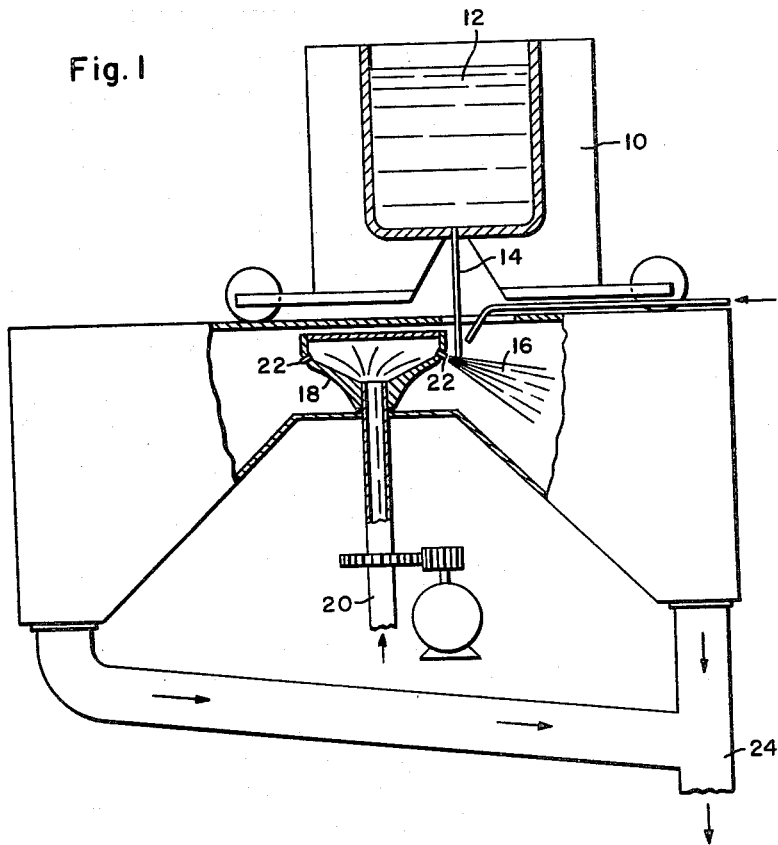
FIGURE 1 is a schematic showing of an atomizing unit.

Briefly, in accordance with this invention, ingots prepared from alloys disclosed in application Serial No. 688,995 are reduced to powder form and a thin oxide film is produced on the individual particles. A sintered billet is prepared from the powder and the billet is hot worked to produce a control rod of high strength.

In application Serial No. 688,995, referred to above, there are disclosed certain novel silver base alloys that have been found to be highly satisfactory for the fabrication of wrought members to be employed as control rods for neutronic reactors of the industrial type. Disclosed therein are binary alloys of silver and indium; ternary alloys of silver, indium and cadmium; and silver, indium and tin; and quaternary alloys of silver, indium, cadmium and tin.

Satisfactory alloy compositions disclosed are those that comprise, by weight, from 65% to 85% of silver, from 2% to 20% of indium, from 0% to 10% of cadmium and from 0% to 5% of tin. Small amounts of aluminum, up to about 1.5%, may be added to the alloy compositions. The binary alloys of silver and indium comprise, by weight, from about 80% to 85% of silver and from 15% to 20% of indium.

Also disclosed in application Serial No. 688,995 is an equation for determining various alloy compositions that will retain a single phase crystal structure and hence insure metallurgical stability of the alloy.

The equation therein disclosed is as follows:

$$X+2Y+3Z+3W+4V=1.4 \text{ and less}$$

where the symbols X, Y, Z, W and V represent the atom fractions of the elements silver, cadmium, indium, aluminum and tin, respectively, where silver is within 65% to 85% and the indium from 2% to 20%, cadmium does not exceed 10%, tin does not exceed 5% and aluminum does not exceed 1.5%, the percentages being by weight. In employing the above equation, it is preferred that the result equal 1.4. However, owing to the various metallurgical problems and the like involved in preparing alloy compositions of this type, the result will sometimes be about 1.3. Such latter alloys may be employed satisfactorily.

When an aluminum addition is made, it will replace indium on an equal atom fraction basis, or it will replace cadmium on the basis of 1.5 atoms of cadmium per atom of aluminum or it will replace silver on the basis of three atoms of silver for each atom of aluminum.

Reference is hereby made to application Serial No. 688,995 for additional alloy compositions, methods for their preparation, and control rods fabricated therefrom.

In accordance with the invention, it has been discovered that the mechanical strength of these alloy compositions can be substantially improved by introducing into the alloy composition a very fine and uniformly distributed metal oxide dispersion. Further, this increase in mechanical strength is accomplished without adversely affecting the other desirable properties of the alloy compositions that render them highly suitable as materials for the fabrication of control rod members.

It has been further determined, in accordance with this invention, that the incorporation into the alloy composition of a fine metal oxide dispersion can be most conveniently accomplished by employing oxides of the metallic elements that are employed in the alloy compositions.

The metal oxides are not introduced into the alloy compositions as such, but are formed as thin layers on the surfaces of finely divided metal alloy particles or powder by oxidizing powder prepared from previously melted and cast ingots of desired alloy composition. It is desirable to first prepare an ingot of the desired alloy composition. Top and bottom specimens are taken from the ingot and examined to determine whether the alloy is homogeneous. This precautionary measure insures homogeneity in the finely divided particles subsequently produced.

Any conventional method of preparation can be employed in producing the initial alloy composition, such for example as the method described in application Serial No. 688,995.

Thus, an alloy composition is prepared by placing in a graphite melting crucible the desired proportions of alloying elements. The alloying elements are melted by means of induction heating apparatus, and to prevent oxidation of the alloying elements during melting a protective cover of calcined coke pellets is preferably placed on the surface of the melt. Ingots of the alloy composition are cast by pouring directly from the bottom of the melting crucible into a suitable mold.

Finely divided powders are then prepared from the ingot and subjected to oxidation whereby a thin highly adherent oxide film is produced on the individual metal particles.

Referring to FIG. 1 of the drawing, there is shown schematically the preferred method for producing oxidized metal powders to be employed in preparing the control rods of this invention.

A previously prepared ingot of desired alloy composition is melted in an induction heated furnace and transferred to pouring furnace 10 which is induction heated so as to maintain the alloy composition 12 in a molten state. The molten alloy composition 12 flows from the pouring furnace 10 through nozzle 14 which has a hole diameter of about 0.25 inch. More than one nozzle may be employed if desired. The molten alloy composition 12 is disintegrated or atomized as it flows from the nozzle 14 by water spray 16 which strikes the small stream of molten alloy composition as it leaves nozzle 14. The molten stream is thus atomized into finely divided particles or powder by the water spray. A thin, highly adherent oxide film is formed on the surface of the finely divided metal alloy particles during cooling of the finely divided metal powder.

The water spray 16 is produced by supplying water to rotating disc 18 through hollow shaft 20. The disc 18 is rotated at a speed of about 6000 r.p.m. and discharges the water through nozzle 22 thereby producing a water spray or jet of sufficient force to break up or atomize the molten alloy composition into finely divided particles or powder. Water from the water spray and the finely divided metal powder are removed from the system by means of conduit 24 and passed to the dewatering system.

The wet metal particles are collected and dried in cloth bags and a substantial amount of water is removed. The resulting damp metal powder is then removed from the bags and further dried on a heated vibrating conveyor.

The method above described not only reduces the molten alloy composition to finely divided particles or powder, but, as before mentioned, produces on the surfaces of the individual particules during cooling a thin, highly adherent metal oxide film. The thin oxide film thus formed prevents further oxidation of the metal alloy in the process. The thin metal oxide film formed on the individual particles is sufficient for the purpose of this invention. Any further oxidation of the particles is not necessary; however, if any further oxidation is desired, this can be conveniently accomplished by heating the powder in an oxidizing environment at temperatures of from about 300° C. to 600° C., preferably under conditions such that the powder is continuously agitated or stirred so as to provide for uniform oxidation of the individual particles.

The amount of oxygen present in the oxidized powder will be about 0.2% by weight and this will be in the form of oxides of the metal alloy. It is possible that an extremely small amount of free oxygen may be dispersed throughout the powder. For the purposes of this invention, it is preferred that the oxygen content in the form of oxides, be present in an amount of from about 0.1% to 0.3% by weight.

It will be obvious to those skilled in the art that other methods may be employed to produce satisfactory oxidized metal powders for use in carrying out this invention. The above described method is the preferred method; however, it is to be understood that this invention is not limited to said described method.

The dried metal particles, carrying a thin, highly adherent oxide film on the surfaces thereof, are classified by screening and all those that pass through a 100 mesh screen are employed in producing the control rods of this invention. Coarser particles, for example, those passing 60 mesh screen, may be employed if desired;

however, it is preferred to employ 100 mesh powder and finer.

Metal powder, preferably 100 mesh and finer, of desired alloy composition and having a thin metal oxide layer on the individual metal particles, is placed in a solid graphite die of desired size and configuration and hot pressed into a sintered billet. The cylindrical solid graphite die is supported by a metallic casing, and upper and lower end rams are employed to produce cylindrical sintered billets for this invention.

The solid graphite die is heated to and maintained at a temperature of from about 1100° F. to 1200° F. during the hot pressing operation. Pressures of from about 12 tons to 20 tons per square inch are applied during hot pressing. Higher or lower pressures may be employed if desired. Pressures of about 15 tons per square inch have proven satisfactory for the purpose of this invention and sintered billets having densities of about 96% of theoretical have been produced at this pressure. The sintered billet, after hot pressing, is removed from the die and cooled to room temperature.

Control rod members for use in neutronic reactors are subsequently prepared from the sintered billets. If necessary, the sintered billets may have their surfaces machined to necessary shape and size. The sintered billets are heated to high temperatures and mechanically worked into control rods of desired size and configuration.

Hot extrusion is the preferred method of producing the control rods of this invention. The sintered billets are heated to temperatures of from about 1200° F. to 1300° F. for at least two hours and then extruded into control rod members of desired configuration. Very little machining is required to bring the finished control rod to desired dimensional accuracy. This preferred method produces dense high strength control rod members that are free from cracks and that possess excellent surface finish.

It will be apparent to those skilled in the art that other methods may be employed for preparing the sintered billet. Thus, the billet can be prepared by cold pressing the metal alloy powder and then sintering the cold pressed compact, or the metal alloy powder may be heated and compacted in the extrusion container prior to extrusion. Satisfactory extruded control rod members can be produced from sintered billets prepared by these methods.

The billets are extruded at an extrusion ratio of at least 10 to 1, and preferably at 20 to 1 and better. Satisfactory extrusions have been made using an extrusion ratio of 13 to 1 and higher. Consistent satisfactory results have been secured by employing an extrusion ratio of 25 to 1. Extrusion ratio is expressed as the ratio of the original cross-sectional area of the billet to final cross-sectional area of the extruded member. During the hot pressing and extrusion steps, the oxide films break up into fine elongated oxide particles which are uniformly dispersed around the grain boundaries.

The extruded member may be employed as such; however, it is preferred to subject the member to a homogenizing or annealing treatment for a period of time of from about 1 hour to 4 hours at temperatures of from about 930° F. to 1295° F. The annealing treatment produces a recrystallized material of fine and uniform grain size.

The following examples are illustrative of the method of producing a control rod in accordance with this invention.

EXAMPLE I

A molten alloy composition is produced by air induction melting 80% by weight of silver, 15% by weight of indium and 5% by weight of cadmium in graphite crucibles. The molten alloy composition is poured into a graphite mold to produce an ingot weighing about 200 pounds. A layer of calcined coke is placed over the melt during melting to prevent oxidation of the alloy components.

The above prepared ingot is remelted in an induction heated furnace and transferred to a pouring furnace of the type described with reference to FIG. 1 of the drawing. Finely divided metal powder having a thin metal oxide film on the individual powders is prepared from the molten alloy composition in accordance with the method previously described in connection with FIG. 1. The powder is screened to remove all particles larger than 100 mesh size.

A cylindrical sintered billet 5.5 inches in diameter and 11 inches in length is produced by placing in a suitable solid graphite die the metal powder having a fineness of 100 mesh and finer, and hot pressing the metal powder under pressure of about 15 tons per square inch and at a temperature of about 1200° F. The solid graphite die is induction heated to the temperature of 1200° F. and is maintained at this temperature during hot pressing. The time required for this operation is usually from about 30 to 40 minutes. The sintered billet is removed from the die and cooled to room temperature.

Four sintered billets of circular cross-section were prepared in the above manner. From three of these billets there were produced two full-size and one half-size control rod members. The billets were heated for about two hours in a furnace that was maintained at a temperature of from about 1200° F. to 1300° F. The sintered billets were removed from the furnace and hot extruded into cruciform-shaped control rod members. The extrusion ratio was 13 to 1. The full-sized control rod members had a cross-sectional span of about 3.50 inches and a blade thickness of about 0.250 inch and a length of 72 inches. The control rod members were completely free from cracks and had good surface finish. The half-size control rod was of same cross-section as the full control rods and had a length of 36 inches.

Tensile and creep specimens were prepared from the half-sized control rod and tensile and creep-rupture tests were carried out.

Table I below shows the results of tensile tests on these tensile specimens at 80° F.

*Table 1*

| Condition of Specimen | Test Temp., ° F. | 0.2% Yield Strength, p.s.i. | Ultimate Strength, p.s.i. | Elongation in 2 inches, Percent | Reduction of area, Percent |
|---|---|---|---|---|---|
| Rod Extruded at 1,300° F | 80 | 22,400 | 46,000 | 29 | 24 |
| Rod Extruded at 1,300° F. and annealed at 1,200° F. for 2 hours | 80 | 20,500 | 45,600 | 35 | 24 |
| Rod Extruded at 1,250° F | 80 | 24,300 | 46,100 | 20 | 22 |

Additional rods were hot extruded from the fourth sintered billets of Example I and tesile specimens prepared therefrom. The tensile specimens were subjected to various annealing conditions, as indicated, prior to testing.

*Table II*

| Condition of Test Specimen | Test Temp., °F. | 2% Yield Strength, p.s.i. | Ultimate Strength, p.s.i. | Reduction of area, percent | Elongation in 2 inches, percent | ASTM Grain Size | Hardness, DPH |
|---|---|---|---|---|---|---|---|
| Extruded at 1,200° F., no anneal | 70 | 27,200 | 52,600 | 15 | 14 | 11-14 | 123.0 |
|  | 600 | 15,600 | 16,700 | 10 | 12 |  |  |
| Extruded at 1,200° F. and annealed 4 hrs. at 1,200° F. | 70 | 28,600 | 43,700 | 14 | 14 |  |  |
|  | 600 | 17,700 | 18,600 | 14 | 9 |  |  |
| Extruded at 1,112° F., no anneal | 70 | 31,200 | 50,800 | 36 | 21 | 10-12 | 111.5 |
|  | 600 | 18,700 | 20,400 | 18 | 17 |  |  |
| Extruded at 1,112° F. and annealed 4 hrs. at 1,022° F. | 70 | 18,500 | 42,200 | 37 | 21 | 10-12 | 109.6 |
|  | 600 | 16,300 | 17,000 | 11 | 8 |  |  |
| Extruded at 1,112° F. and annealed 2 hrs. at 1,112° F. | 70 | 22,100 | 46,100 | 36 | 25 | 10-12 | 108.4 |
|  | 600 | 15,400 | 19,500 | 21 | 14 |  |  |
| Extruded at 1,112° F. and annealed 2 hrs. at 1,200° F. | 70 | 22,900 | 50,800 | 36 | 26 | 10-12 | 107.4 |
|  | 600 | 15,900 | 19,100 | 22 | 15 |  |  |
| Extruded at 1,112° F. and annealed 4 hrs. at 1,200° F. | 70 | 17,900 | 42,200 | 33 | 24 |  |  |
|  | 550 | 19,600 | 25,600 | 18 | 15 |  |  |
| Extruded at 1,112° F. and annealed 2 hrs. at 1,292° F. | 70 | 18,500 | 42,200 | 32 | 22 | 9-11 | 94.0 |
|  | 550 | 17,400 | 20,000 | 18 | 14 |  |  |

EXAMPLE II

An alloy composition comprising, by weight, about 15% indium, about 5% cadminum, about 0.2% aluminum and the balance silver is used to produce extruded members in the same manner as Example I. The following table, Table III, gives the tensile test data on these extruded members at various temperatures.

*Table III*

| Condition of Specimen | Test Temp., °F. | 0.2% Yield Strength, p.s.i. | Ultimate Strength, p.s.i. | Reduction of area, Percent | Elongation in 2 inches Percent |
|---|---|---|---|---|---|
| Extruded at 1,112° F., no anneal | 70 | 20,400 | 44,100 | 11 | 12 |
|  | 500 | 20,900 | 26,300 | 15 | 8 |
|  | 550 | 19,100 | 21,100 | 18 | 13 |
|  | ¹600 | 17,600 | 19,300 | 11 | 9 |
| Extruded at 1,112° F. and annealed 4 hours at 932° F. | 70 | 19,400 | 45,200 | 29 | 20 |
|  | 550 | 18,100 | 19,400 | 11 | 12 |
| Extruded at 1,112° F. and annealed 2 hrs. at 1,200° F. | ¹70 | 18,500 | 43,100 | 11 | 11 |
|  | 550 | 19,100 | 21,500 | 11 | 14 |
| Extruded at 1,112° F. and annealed 8 hrs. at 1,112° F. | 70 | 18,500 | 42,200 | 11 | 11 |
|  | 550 | 20,600 | 23,700 | 11 | 18 |
| Extruded at 1,112° F. and annealed 8 hrs. at 1,292° F. | 70 | 15,200 | 41,800 | 9 | 11 |
|  | 550 | 19,100 | 23,700 | 11 | 13 |

¹ Sample fractured at gage mark.

EXAMPLE III

Table IV below gives tensile data on extruded members prepared in accordance with this invention. These extruded members are prepared in accordance with Example I from an alloy composition comprising, by weight, 15% indium, 5% cadium, 0.1% aluminum and the balance being silver.

*Table IV*

| Test Specimen | Test Temp., °F. | 0.2% Yield Strength, p.s.i. | Ultimate Strength, p.s.i. | Reduction of area, percent | Elongation in 2 inches, percent |
|---|---|---|---|---|---|
| Extruded at 1,112° F., no anneal | 70 | 23,100 | 45,200 | 26 | 21 |
|  | 500 | 23,100 | 27,900 | 8 | 13 |
|  | ¹550 | 19,800 | 23,300 | 11 | 8 |
|  | ¹600 | 17,400 | 18,100 | 11 | 9 |
| Extruded at 1,112° F. and annealed 2 hours at 932° F. | 70 | 24,400 | 48,100 | 30 | 20 |
|  | 550 | 20,700 | 23,300 | 14 | 11 |
| Extruded at 1,112° F. and annealed 4 hours at 932° F. | 70 | 21,800 | 45,000 | 30 | 23 |
|  | 500 | 22,200 | 27,200 | 14 | 15 |
|  | ¹550 | 19,800 | 22,900 | 11 | 7 |
|  | ¹600 | 17,800 | 18,800 | 14 | 8 |
| Extruded at 1,112° F. and annealed 2 hours at 1,112° F. | ¹70 | 23,700 | 46,700 | 30 | 21 |
|  | 550 | 20,000 | 21,800 | 11 | 9 |
| Extruded at 1,112° F. and annealed 2 hours at 1,200° F. | 70 | 21,100 | 45,500 | 52 | 22 |
|  | 550 | 18,100 | 20,200 | 14 | 15 |
| Extruded at 1,112° F. and annealed 2 hours at 1,292° F. | 70 | 21,100 | 35,500 | 7 | 4 |
|  | 550 | 18,800 | 21,100 | 11 | 10 |

¹ Sample fractured at gage mark.

Figure 2:
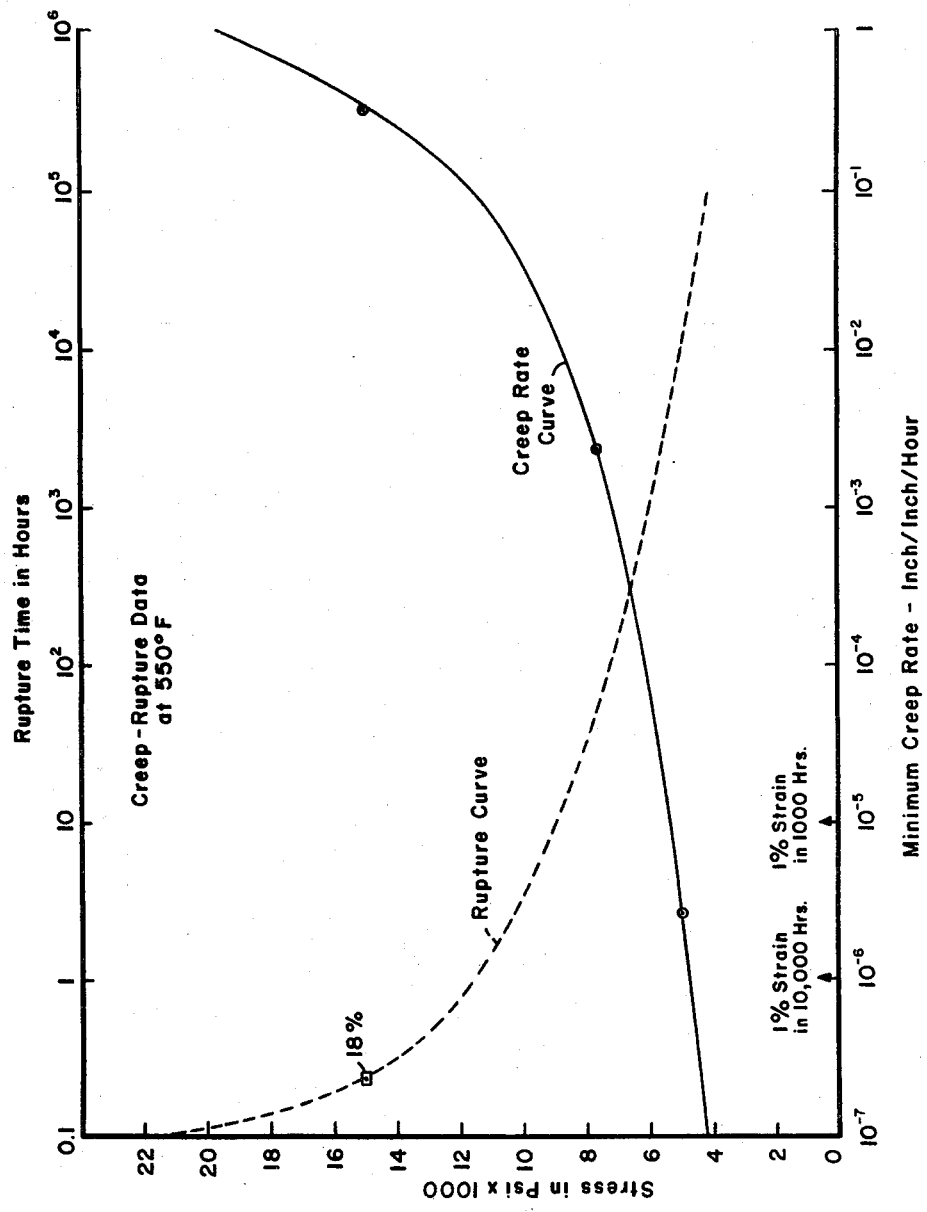
FIGS. 2 and 3 are graphs showing creep-rupture data.
Figure 3:
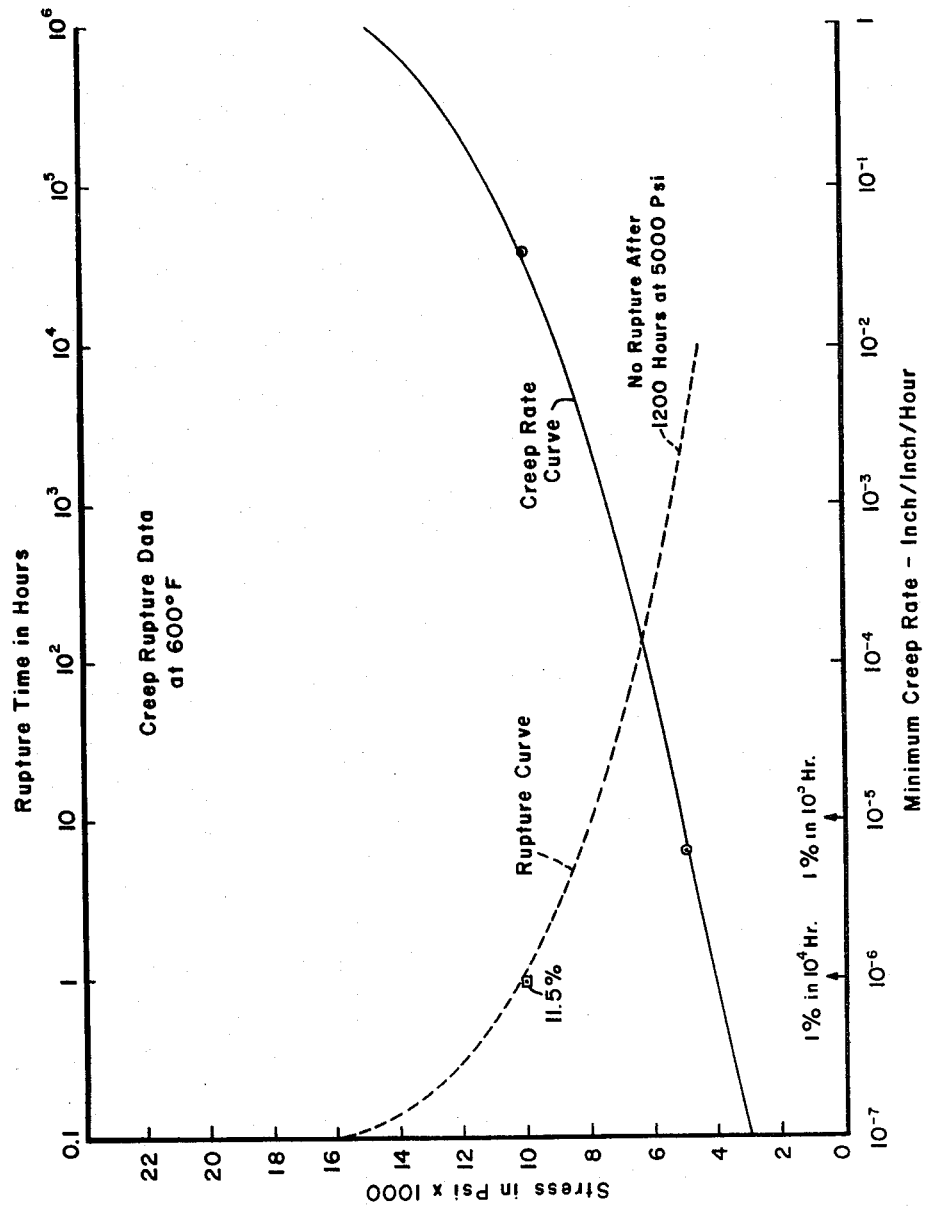

Creep rupture data were obtained on extruded members prepared in accordance with this invention from an alloy composition comprising, essentially, about 85% silver, 15% indium and 5% cadmium. The specimens were annealed at 1200° F. for two hours prior to testing. FIGURE 2 shows data obtained at a test temperature of 550° F. and FIGURE 3 shows data obtained at 600° F. test temperature.

It will be noted in FIG. 2 of the drawing that the minimum creep rate curve shows a 1% strain in 10,000 hours at 4,700 p.s.i. and 550° F. In FIG. 3 of the drawing, it will be noted that the minimum creep rate curve shows a 1% strain in 10,000 hours at 4,000 p.s.i. and 600° F. Also, it is to be noted in FIG. 3 that after 1200 hours at 5000 p.s.i. the specimen had not ruptured.

Figure 4:
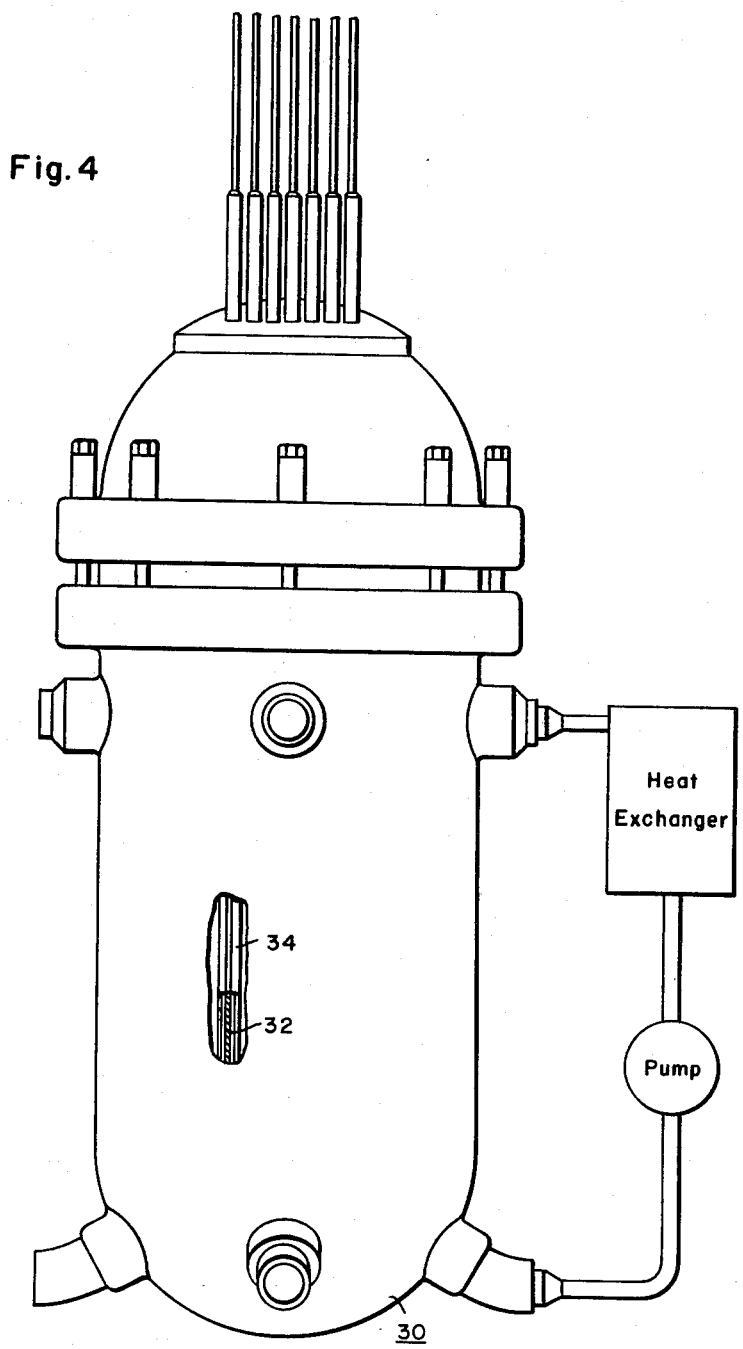
FIG. 4 is a view in elevation of a neutronic reactor with a portion thereof cut away.

Referring to FIG. 4 of the drawing, there is shown a neutronic reactor 30 with a portion thereof cut away to show a control rod 32 positioned between fuel elements 34. The reactor shown is a pressurized water reactor which employs water under a pressure of several thousand p.s.i. as a moderator. The temperature to which the control rod 32 will be subjected during use will be of the order of from about 525° F. to 550° F.; however, there may be area in the reactor that may reach as high as 630° F., such, for example, as occur near hot spots on the fuel elements. Control rods prepared in accordance with the present invention are especially well suited for use in such reactors. However, the control rods are suitable for use in other reactors. For a detailed description of the components that comprise a pressurized water reactor and the manner of its operation, reference is made to the Westinghouse Engineer, volume 17, No. 5, page 131, September 1957.

Control rod members prepared in accordance with this invention have high strength and good resistance to creep which make them highly satisfactory for use in military type reactors.

It will be understood that the description and drawings are exemplary and not in limitation of the invention.

We claim as our invention:

1. A control rod member for use in neutronic reactors consisting of highly compressed and sintered finely divided metal alloy particles and fine metal oxide particles substantially uniformly distributed therethrough, said metal alloy consisting essentially of, by weight, from 65% to 85% of silver, from 2% to 20% of indium, up to 10% of cadmium, up to 5% of tin and up to 1.5% of aluminum, the amount of each element employed in the preparation of the alloy being determined by the equation $$X+2Y+3Z+3W+4V = \text{about } 1.4$$

where X, Y, Z, W and V represent the atom fractions of the elements silver, cadmium, indium, aluminum and tin respectively, the said oxide particles being metal oxides of the metal alloy composition and the amount of oxygen present being from about 0.1% to 0.3% by weight which said oxygen is substantially all present in the form of the metal oxide, said control rod being characterized by its high strength and resistance to creep at elevated temperatures.

2. A control rod member for use in neutronic reactors consisting of highly compressed and sintered finely divided metal alloy particles and fine metal oxide particles substantially uniformly dispersed therethrough, said metal alloy comprising essentially, by weight, about 80% silver, about 15% indium and about 5% cadmium, the said oxide particles being metal oxides of the metal alloy composition and the amount of oxygen present being from about 0.1% to 0.3% by weight which said oxygen is substantially all present in the form of the metal alloy oxide, said control rod being characterized by its high strength and resistance to creep at elevated temperatures.

3. A control rod member for use in neutronic reactors consisting of highly compressed and sintered finely divided metal alloy particles and fine oxide particles substantially uniformly dispersed therethrough, said metal alloy consisting essentially of, by weight, about 15% indium, about 5% cadmium, from about 0.1% to 1.5% aluminum and the balance being all silver, the said oxide particles being metal oxides of the metal alloy composition and the amount of oxygen present being from about 0.1% to 0.3% by weight which said oxygen is substantially all present in the form of the metal alloy oxide, said control rod being characterized by its high strength and resistance to creep at elevated temperatures.

4. In a neutronic reactor, means for producing neutrons located within the reactor and means for controlling the number of neutrons produced thereby, said means for controlling the number of neutrons produced consisting of highly compacted and sintered finely divided metal alloy particles and fine metal oxide particles substantially uniformly dispersed therethrough, said metal alloy consisting essentially of, by weight, from 65% to 85% of silver, from 2% to 20% of indium, up to 10% of cadmium, up to 5% of tin, and up to 1.5% of aluminum, the amount of each element employed in the preparation of the alloy being determined by the equation $X+2Y+3Z+3W+4V = \text{about } 1.4$, where X, Y, Z, W and V represent the atom fractions of the elements silver, cadmium, indium, aluminum and tin respectively, the said oxide particles being metal oxides of the metal alloy composition and the amount of oxygen is substantially all present in the form of metal oxide.

5. In a neutronic reactor, means for producing neutrons located within the reactor and means for controlling the number of neutrons produced thereby, said means consisting of highly compacted and sintered finely divided metal alloy particles and fine metal oxide particles substantially uniformly dispersed therethrough, said metal alloy comprising essentially, by weight, about 80% silver, about 15% indium and about 5% cadmium, the said oxide particles being metal oxides of the metal alloy composition and the amount of oxygen present being from about 0.1% to 0.3%, by weight, which said oxygen is substantially all present in the form of the metal oxide.

References Cited in the file of this patent

UNITED STATES PATENTS

| | | |
|---|---|---|
| 2,384,892 | Comstock | Sept. 18, 1945 |
| 2,486,341 | Stumbock | Oct. 25, 1949 |
| 2,545,438 | Stumbock | Mar. 20, 1951 |

FOREIGN PATENTS

| | | |
|---|---|---|
| 625,364 | Great Britain | June 27, 1949 |

OTHER REFERENCES

Coen and Birkel: YAEC-35, U.S. AEC report, dated July 30, 1957; pp. 43–45.